(12) United States Patent
Bromberg et al.

(10) Patent No.: US 10,026,431 B2
(45) Date of Patent: Jul. 17, 2018

(54) MAGNETIC SHIFT REGISTER

(71) Applicant: Carnegie Mellon University, Pittsburgh, PA (US)

(72) Inventors: David M. Bromberg, Pittsburgh, PA (US); Lawrence Pileggi, Pittsburgh, PA (US); Jian-Gang Zhu, Pittsburgh, PA (US)

(73) Assignee: Carnegie Mellon University, Pittsburgh, PA (US)

( * ) Notice: Subject to any disclaimer, the term of this patent is extended or adjusted under 35 U.S.C. 154(b) by 284 days.

(21) Appl. No.: 15/032,951

(22) PCT Filed: Oct. 31, 2014

(86) PCT No.: PCT/US2014/063319
§ 371 (c)(1),
(2) Date: Apr. 28, 2016

(87) PCT Pub. No.: WO2015/112214
PCT Pub. Date: Jul. 30, 2015

(65) Prior Publication Data
US 2016/0293197 A1    Oct. 6, 2016

Related U.S. Application Data

(60) Provisional application No. 61/962,178, filed on Nov. 1, 2013.

(51) Int. Cl.
*G11C 11/14* (2006.01)
*G11B 5/73* (2006.01)
(Continued)

(52) U.S. Cl.
CPC ............ *G11B 5/7315* (2013.01); *G11B 5/653* (2013.01); *G11B 5/656* (2013.01); *G11B 5/714* (2013.01);
(Continued)

(58) Field of Classification Search
CPC ........ G11C 11/14; G11B 5/656; G11B 5/7325
(Continued)

(56) References Cited

U.S. PATENT DOCUMENTS

| | | | | |
|---|---|---|---|---|
| 4,134,138 A | * | 1/1979 | Cardot | G11B 27/105 360/39 |
| 2007/0030718 A1 | | 2/2007 | Cowburn | |

(Continued)

FOREIGN PATENT DOCUMENTS

WO    WO2015112214    7/2015

OTHER PUBLICATIONS

Parkin et al., "Magnetic Domain-Wall Racetrack Memory", Science, vol. 320:190-194, 2008, 5 pages.
(Continued)

*Primary Examiner* — Harry W Byrne
(74) *Attorney, Agent, or Firm* — Fish & Richardson P.C.

(57) ABSTRACT

This disclosure relates to a memory device that includes at least one magnetic track on a substrate, wherein the at least one magnetic track comprises one or more magnetic domains. Contacts can be disposed on the at least one magnetic track according to a predetermined arrangement to form a plurality of bitcells on the at least one magnetic track, wherein each one of the plurality of bitcells is configured to store at least one magnetic domain. The device can include a timing circuit connected to the contacts, with the timing circuit being configured to apply to the contacts multiple phases of electric currents according to a predetermined timing sequence to cause the at least one magnetic domain to shift from the each one of the plurality of bitcells to an adjacent one of the plurality of bitcells on the at least one magnetic track.

23 Claims, 15 Drawing Sheets

(51) Int. Cl.
  *G11B 5/855* (2006.01)
  *G11B 5/714* (2006.01)
  *G11B 5/84* (2006.01)
  *G11B 5/65* (2006.01)
  *G11B 5/851* (2006.01)
  *G11B 5/00* (2006.01)
(52) U.S. Cl.
  CPC .............. *G11B 5/7325* (2013.01); *G11B 5/84* (2013.01); *G11B 5/851* (2013.01); *G11B 5/855* (2013.01); *G11B 2005/0024* (2013.01)
(58) Field of Classification Search
  USPC .......................................................... 365/171
  See application file for complete search history.

(56) References Cited

U.S. PATENT DOCUMENTS

| 2007/0087454 | A1* | 4/2007 | Chen | ....................... G11C 11/14 438/3 |
| --- | --- | --- | --- | --- |
| 2008/0068881 | A1* | 3/2008 | Lim | ........................ G11C 11/14 365/173 |
| 2008/0243972 | A1* | 10/2008 | Gaidis | .................... B82Y 10/00 708/130 |
| 2008/0253161 | A1* | 10/2008 | Parkin | ..................... G11C 11/14 365/80 |
| 2010/0080034 | A1 | 4/2010 | Hung | |
| 2010/0208381 | A1 | 8/2010 | Kim et al. | |
| 2010/0284209 | A1* | 11/2010 | Kim | ........................ G11C 8/14 365/80 |
| 2011/0090730 | A1 | 4/2011 | Tsai et al. | |
| 2013/0242647 | A1 | 9/2013 | Nakamura et al. | |

OTHER PUBLICATIONS

Notification of Transmittal of the International Search Report and the Written Opinion of the International Searching Authority, or the Declaration for Int'l. Application No. PCT/US2014/063319, dated Jul. 21, 2015, 21 pages.

* cited by examiner

MAGNETIC SHIFT REGISTER

CLAIM OF PRIORITY

This application claims the benefit of priority under 35 U.S.C. § 119(e) to provisional U.S. Patent Application No. 61/962,178, filed Nov. 1, 2013. The entire contents of the prior-filed provisional application are hereby incorporated by reference.

STATEMENT REGARDING FEDERALLY-SPONSORED RESEARCH AND DEVELOPMENT

This invention was made with partial government support under NSF grants CCF1146799 and I-ARPA grant N66001-12-C-2005. The government has certain rights in this invention.

FIELD OF USE

This disclosure relates to magnetic memory devices. More particularly, this disclosure relates to non-volatile, high-density, low-energy serial magnetic memory.

BACKGROUND

The need to store and quickly access large amounts of data is becoming increasingly important as memory-intensive applications evolve. Additionally, energy-constrained systems (e.g., sensor networks) demand low-energy, non-volatile memory. There is thus a need for truly "universal" memory device that satisfies all these requirements. Magnetic hard disk drives are non-volatile, extremely dense, and low-cost, but operate at very slow speed. Flash memory can also be non-volatile and accessed and written to much faster than a hard drive, but still considerably slower the on-chip cache. Cache memory (SRAM) and main memory (DRAM) are typically fast, require a stable power supply, and can have higher cost-per-bit than flash memory.

In the past few years, a non-volatile, high-density, low-energy serial magnetic memory known as "racetrack" has received much attention as a potential candidate to replace flash or DRAM memories. Racetrack memory involves shifting magnetic domain walls, regions of opposing magnetization in a magnetic material, between stable domain wall positions (notches) along a track. The domain wall shifting mechanism is current-driven, traditionally spin transfer torque (STT), where a spin-polarized input current imparts a torque on local magnetic moments causing them to align in the direction of the electron spin. Stored data bits of the racetrack are read out serially via a magnetic sensor (e.g., magnetic tunnel junction) in proximity to the track somewhere along the shift register.

Although elegant in its simplicity, racetrack memory has fundamental issues of control that make implementing it a major challenge. Specifically, causing a movement of a multitude of domain walls by a single bit position (e.g., no more and no less) with a single current pulse down the track can be difficult. Variability in domain wall pinning potential along the track, the inherent stochasticity of domain wall motion, and the inability to margin the current pulse make data bit errors likely.

Therefore, a need exists for a non-volatile, high-density, low-energy serial magnetic memory with, for example, control at a level of single bit positions.

SUMMARY

The present disclosure relates to a serial magnetic shift register that can overcome control issues with, for example, a racetrack memory. In an implementation, multiple phases of current can be applied to a memory structure including a serial magnetic shift register with placement of contacts along a magnetic track that can cause domain walls in the track to not shift by more than one bit position. Furthermore, the use of multiple phases combined with the placement of contacts can allow margining of the current pulse, such that larger currents may be applied to guarantee that all the walls shift without causing some walls to move beyond one bit position. Without having to write data by pushing current through a magnetic tunnel junction, this memory scheme can allow for lower write energy than traditional approaches to non-volatile magnetic memory (MRAM). Placing contacts along the length of the track can also obviate a need to pattern or notch the track, as can be needed with racetrack memory because lower-energy positions and stopping points for the domain walls can be inherent to the structure and controlled by the applied currents and voltages at the contacts. The domain walls can be shifted in either direction along the track given the clocking scheme, allowing bits to be moved back into the storage area if required. Despite requiring multiple phases to fully shift a data bit, the high velocity of current-driven domain walls still accommodates 1-2 ns shift time with just 10 µA current pulses. Multiple shift registers can be addressed and accessed independently to reduce the latency of a serial memory. Density can be improved by sharing contacts and leads among many magnetic tracks and by stacking tracks vertically.

In one aspect, a memory device includes at least one magnetic track on a substrate, wherein the at least one magnetic track comprises one or more magnetic domains. The memory device can include contacts that can be disposed on the at least one magnetic track according to a predetermined arrangement to form a plurality of bitcells on the at least one magnetic track, wherein each one of the plurality of bitcells is configured to store at least one magnetic domain. The memory device can include a timing circuit connected to the contacts, with the timing circuit being configured to apply to the contacts multiple phases of electric currents according to a predetermined timing sequence to cause the at least one magnetic domain to shift from the each one of the plurality of bitcells to an adjacent one of the plurality of bitcells on the at least one magnetic track.

Implementations can include one or more of the following features. The at least one of the one or more magnetic domains can include a magnetic domain of a first or a second magnetization as a data bit. The contacts disposed on the at least one magnetic track according to the predetermined arrangement can include contacts disposed along first and second lengths of the at least one magnetic track. The contacts disposed on the at least one magnetic track according to the predetermined arrangement can include contacts disposed along a first length of the at least one magnetic track and not along a second length of the at least one magnetic track.

In an example, the contacts disposed on the at least one magnetic track according to the predetermined arrangement can include a first set of the contacts disposed along a first length of the at least one magnetic track, a second set of the contacts also disposed along the first length of the at least one magnetic track, wherein the first set of the contacts are spatially interleaved with the second set of the contacts, a third set of the contacts disposed along a second length of the at least one magnetic track, and a fourth set of contacts also disposed along the second length of the at least one magnetic track, wherein the third set of the contacts are spatially interleaved with the fourth set of the contacts.

In an example, the contacts disposed on the at least one magnetic track according to the predetermined arrangement can include a first set of the contacts disposed along a first length of the at least one magnetic track and connected to a top side of the at least one magnetic track, a second set of the contacts disposed along the first length of the at least one magnetic track and connected to a bottom side of the at least one magnetic track, wherein the first set of the contacts are spatially interleaved with the second set of the contacts, a third set of the contacts disposed along a second length of the at least one magnetic track and connected to the top side of the at least one magnetic track, and a fourth set of contacts disposed along the second length of the at least one magnetic track and connected to the bottom side of the at least one magnetic track, wherein the third set of the contacts are spatially interleaved with the fourth set of the contacts.

The contacts disposed on the at least one magnetic track according to the predetermined arrangement can include a first set of the contacts connected to a selected one of a top or bottom side of the at least one magnetic track.

The each one of the plurality of bitcells can include a selected set of the contacts, and the timing circuit can be configured to apply to the contacts: a) first phases of electric currents such that a first pair of the selected set of the contacts is driven to complementary signal levels while a second, different pair of the selected set of the contacts is in a high impedance state, and b) second phases of electric currents such that the second pair of the selected set of the contacts is driven to the complementary signal levels while the first pair of the selected set of the contacts is in the high impedance state.

The magnetic domains can include at least two magnetic domains of opposing first and second magnetizations that are separated by a domain wall. At least one of the plurality of bitcells comprises a domain wall separating magnetic domains of opposing first and second magnetizations.

The domain wall can be moved based on a one of a a) spin-transfer torque principle, b) spin-orbit torque principle, or c) combination of spin-transfer torque principle, and spin-orbit torque principle.

The each one of the plurality of bitcells can include a selected set of the contacts and a domain wall, and causing the at least one magnetic domain to shift from the each one of the plurality of bitcells to an adjacent one of the plurality of bitcells on the at least one magnetic track can include applying complementary signal levels to a first pair of the selected set of the contacts to cause a flow of current between the first pair of the selected set of the contacts, the flow of current causing the domain wall to move in a same or an opposite direction relative to the flow of current.

The each one of the plurality of bitcells can include a selected set of the contacts and a domain wall, and a movement of the domain wall can be at least partially controlled by a back current flowing from one to another of a first pair of the selected set of the contacts driven by complementary signal levels. The predetermined arrangement of the contacts along the at least one magnetic track can be selected to avoid a flow of current between contacts that are connected to a driver with an output that is in a high impedance state.

The memory device can include a read device connected to the at least one magnetic track for detecting a magnetization of a magnetic domain on the at least one magnetic track as a data bit. For example, the read device can be a selected one of a) a magnetic tunnel junction, and b) a giant magnetoresistive stack.

The memory device can include a write device for injecting a domain wall into the at least one magnetic track by causing a current to flow through a wire, wherein the write device can include the wire, which is disposed adjacent to the at least one magnetic track. The memory device can include a write device for injecting a domain wall into the at least one magnetic track, wherein the write device can include a magnetic device that is magnetically coupled to a portion of the at least one magnetic track. The memory device can include a write device for injecting a domain wall into the at least one magnetic track, wherein the write device can be based on a spin-transfer torque technique.

For example, the timing circuit can include a CMOS tri-state drive circuit configured to output at least a logic-1 state and a logic-0 state corresponding to predetermined complementary signal levels, and a high-impedance state corresponding to a floating contact state.

In another aspect, a method includes obtaining at least one magnetic track on a substrate, wherein the at least one magnetic track comprises one or more magnetic domains, obtaining contacts disposed on the at least one magnetic track according to a predetermined arrangement to form a plurality of bitcells on the at least one magnetic track, wherein each one of the plurality of bitcells is configured to store at least one magnetic domain of the one or more magnetic domains, and applying to the contacts multiple phases of electric currents according to a predetermined timing sequence to cause the at least one magnetic domain to shift from the each one of the plurality of bitcells to an adjacent one of the plurality of bitcells on the at least one magnetic track.

Implementations can include one or more of the following features. The each one of the plurality of bitcells can include a selected set of the contacts and wherein applying to the contacts multiple phases of electric currents according to a predetermined timing sequence can include applying first phases of electric currents such that a first pair of the selected set of the contacts is driven to complementary signal levels while a second, different pair of the selected set of the contacts is in a high impedance state, and applying second phases of electric currents such that the second pair of the selected set of the contacts is driven to the complementary signal levels while the first pair of the selected set of the contacts is in the high impedance state.

In another aspect, a memory device includes a plurality of magnetic tracks, contacts disposed on each one of the plurality of magnetic tracks to form a plurality of bitcells on the each one of the plurality of magnetic tracks, wherein the contacts can include a first set of the contacts that are disposed along a first length of the each one of the plurality of magnetic tracks, a second set of the contacts that are also disposed along the first length of the each one of the plurality of magnetic tracks, wherein the first set of the contacts are spatially interleaved with the second set of the contacts, a third set of the contacts that are disposed along a second length of the each one of the plurality of magnetic tracks, and a fourth set of contacts that are also disposed along the second length of the each one of the plurality of magnetic tracks, wherein the third set of the contacts are spatially interleaved with the fourth set of the contacts, and a timing circuit connected to the contacts.

Other features are apparent from the following description and the claims.

BRIEF DESCRIPTION OF THE DRAWINGS

Like reference numbers represent corresponding parts and/or portions throughout.

DETAILED DESCRIPTION

This disclosure relates to a serial magnetic memory that includes a track of magnetic material and electrical contacts to the magnetic material. For example, a number of domain walls can be stored within the magnetic track. These domain walls, or the distinct magnetization regions they separate, can represent data bits stored in the memory. For example, for a track with a perpendicular anisotropy, a magnetization oriented "up" can be treated as a logic-1 and magnetization oriented "down" can be treated as a logic-0, or vice versa. In some examples, in-plane magnetization can also be used.

A flow of current through the magnetic material can cause the domain walls to shift their positions. For example, any physical phenomena that causes current-driven domain wall motion can be used in the examples described herein. For example, spin-transfer torque can be exploited to shift the domain walls along the direction of the electron flow, or the spin Hall effect (in combination with internal or externally-applied magnetic fields) can be exploited to shift the domain walls along the direction of the current flow or along the direction of the electron flow.

For example, a serial magnetic memory device can include at least one magnetic track on a substrate that has one or more magnetic domains. The device can include contacts that are disposed on track in accordance to a predetermined arrangement as described in detail below. The contacts can form a plurality of bitcells on the track. Each bitcell can be configured to store at least one magnetic domain. In some examples, a timing circuit can be connected to the contacts and configured to apply to the contacts multiple phases of electric currents. For example, the multiple phases of currents can be applied according to a predetermined timing sequence. In this manner, a magnetic domain can be shifted from one bitcell to an adjacent bitcell on the track.

Figure 1:
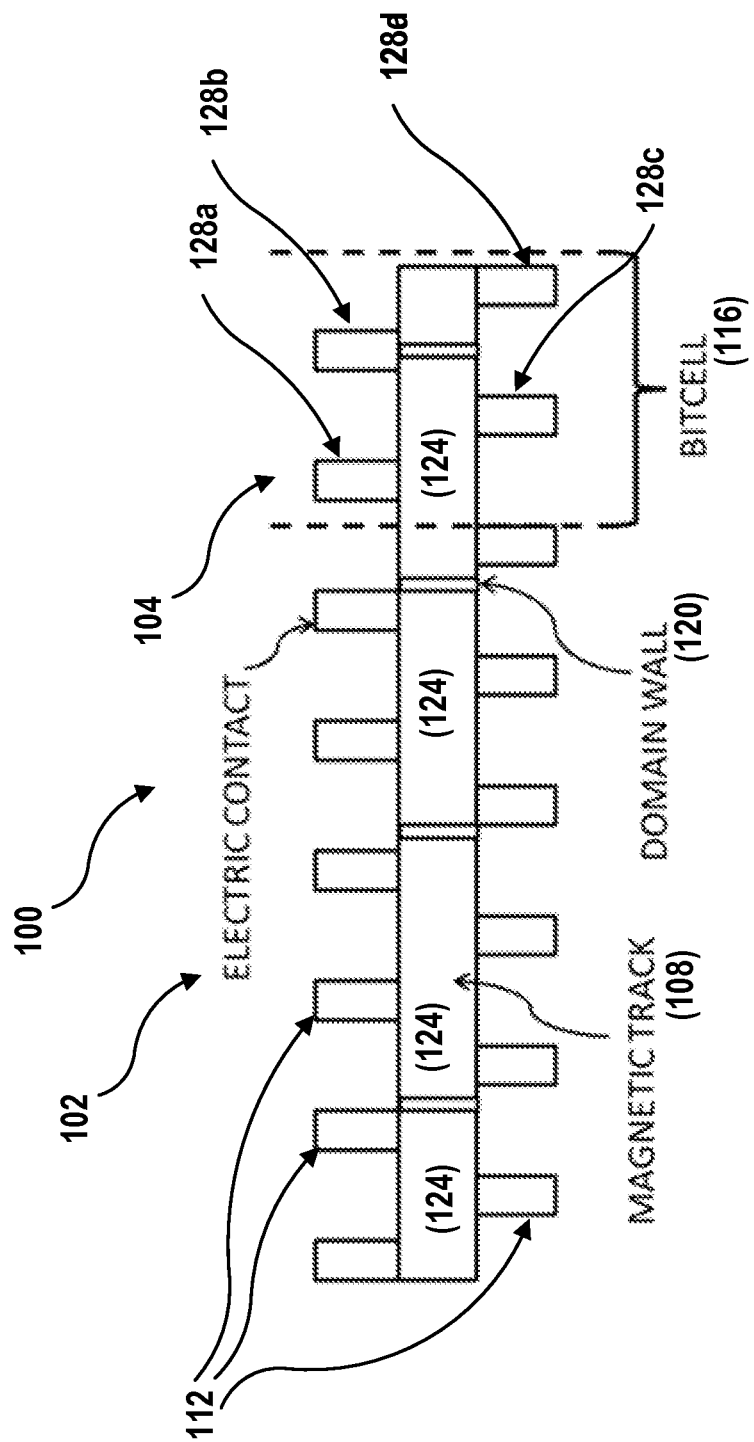
FIG. 1 shows a cross-sectional illustration of a segment of the shift register consisting of multiple bitcells and data bits (e.g., domain walls or, more generally, magnetization directions).

FIG. 1 shows a cross-section view 100 of an example contact arrangement 102 for a magnetic device 104. A magnetic track 108 is connected to a plurality of contacts 112 disposed on the track 108. As shown, the contacts 112 can be disposed such that the track 108 can be divided into bitcells. For example, a bitcell 116 can include at least four contacts 128a-d (bitcell contacts). In some examples, the track 108 can include multiple domain walls 120 separating magnetic domains 124.

Figure 2:
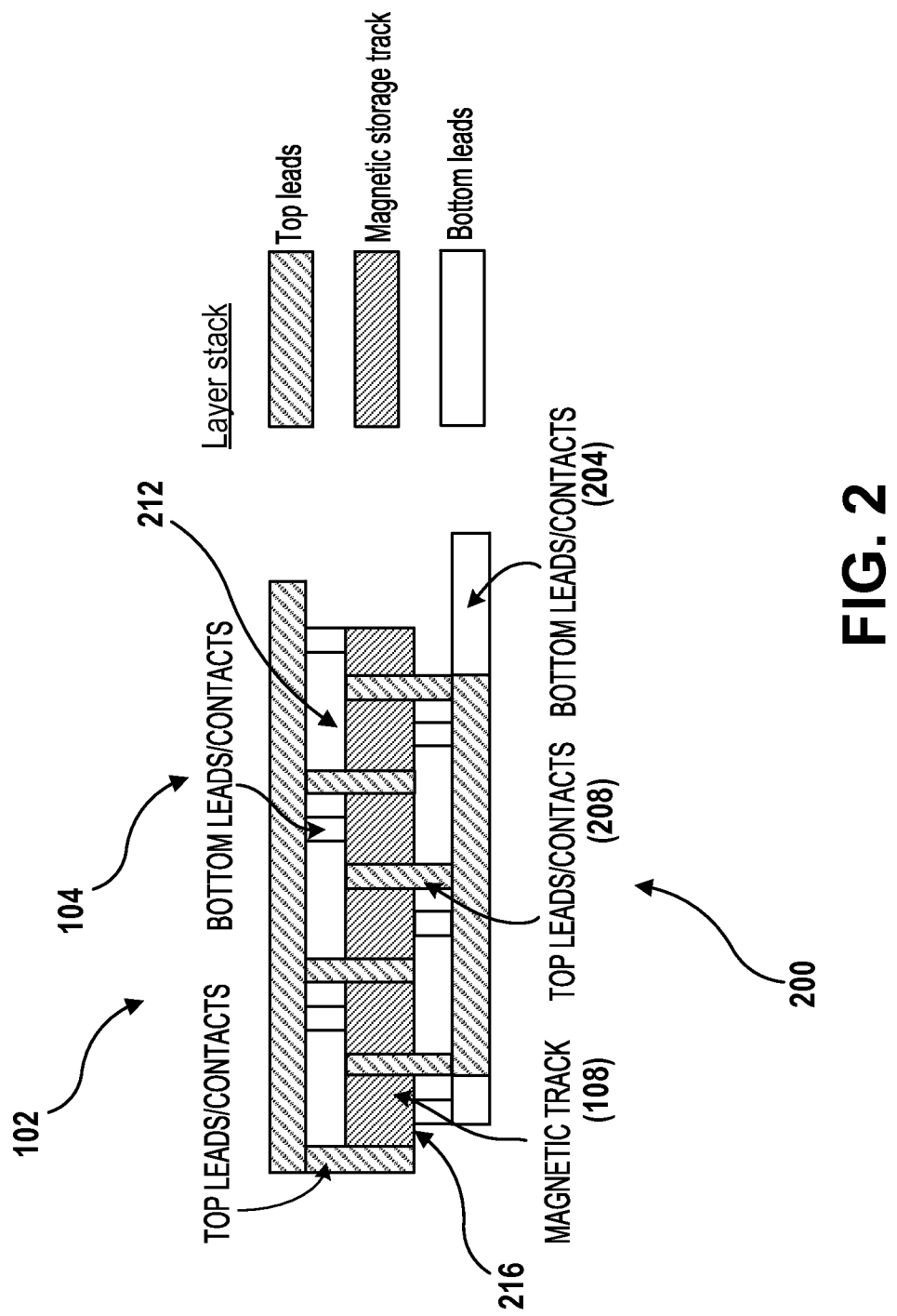
FIG. 2 shows an example layout of a segment of the shift register with electrical connections.

FIG. 2 shows a top-down view 200 of the example contact arrangement 100 for the magnetic device 104. In some examples, the track 104 of magnetic material can be deposited on top of bottom electrodes and leads (or contacts) 204. For example, the bottom side contacts 204 can be made along a first length (e.g., along a top length 212) and a second length (e.g., along a bottom length 216) of the track 104. In some examples, after the track 104 is obtained on the bottom contacts 204, additional electrical connections 208 can be made to a top side of the track 104. In an implementation, the top side contacts 204 can also be made along the first length (e.g., along the top length 212) and the second length (e.g., along the bottom length 216) of the track 104.

In an implementation, the contact arrangement 100 can be designed such that the top contacts 208 are spatially interleaved with the bottom contacts 204. As discussed below, this may allow for precise control over a location of the domain walls (e.g., domain walls 120) in the magnetic track 108 during the shifting process and in steady state when no current is applied.

Figure 3:
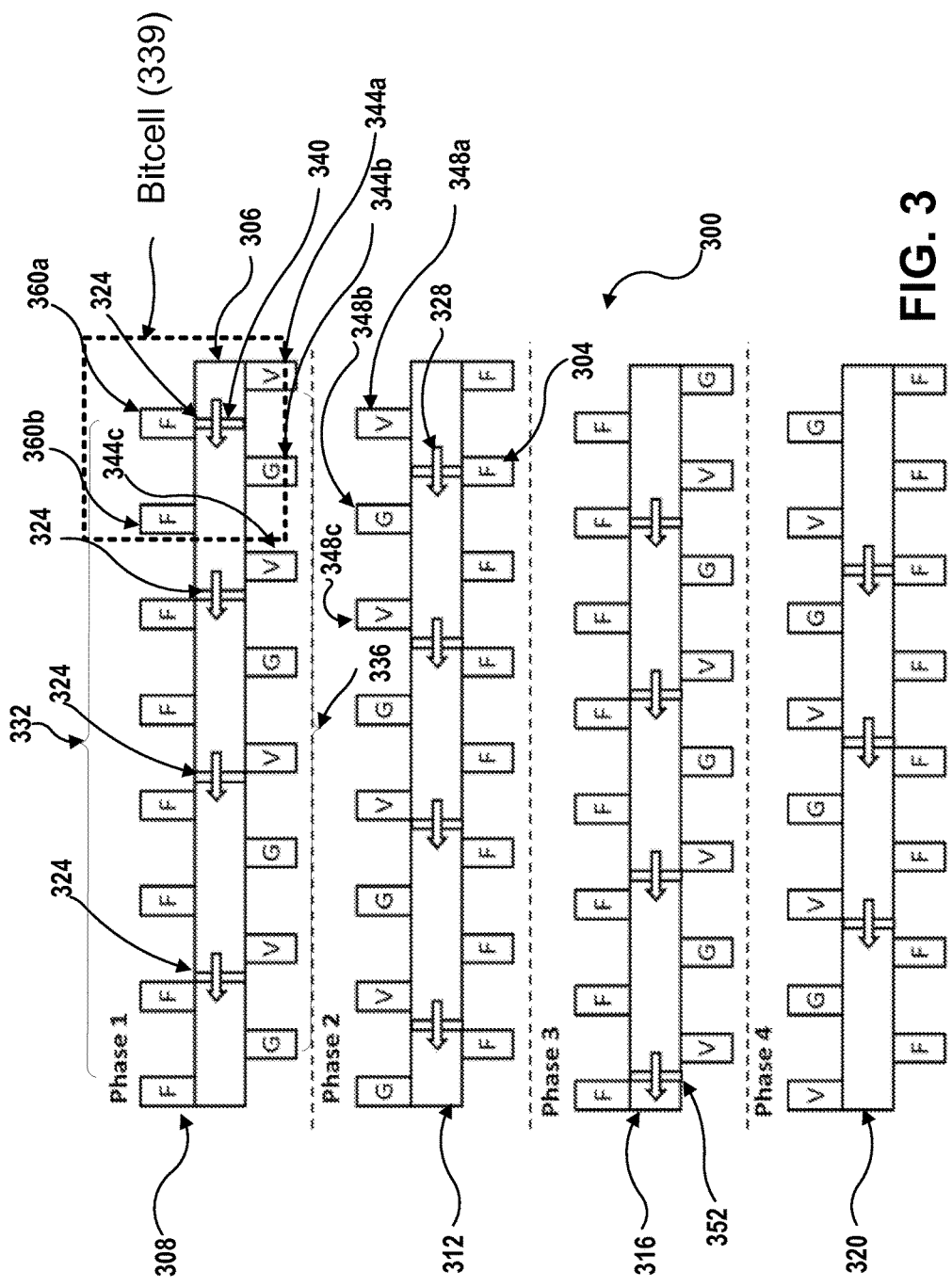
FIG. 3 shows an example phases of a magnetic track.

FIG. 3 shows an exemplary four-phase clocking scheme 300 of the example shown in FIGS. 1-2. The labels on the contacts 304 on the magnetic track 306 indicate applied voltage ("V"), ground ("G"), or floating ("F"). For example, "floating" can mean that the contact (e.g., one of the contacts 304) is not directly driven to a predefined voltage by a driver circuit. For example, "floating" can mean that the contact 304 is placed in a high impedance state, e.g., by being connected to a driver that has its output at a high impedance. For example, a potential of the contact 304 can be indirectly set due to resistive connections to other elements. In implementations, because only a potential difference between the contacts 304 may matter in terms of a flow of current, positive and negative voltages may be used in place of "V" and "G." As such, in implementations, the use of a single voltage polarity and ground may be arbitrarily chosen. In each phase 308-320, the location of the domain walls 324 are noted in the track 306 as shown, with the direction of motion indicated by an arrow 328. For this description we have chosen to take the domain wall velocity in the direction of the current flow, though as described earlier this is also arbitrary. In the example of FIG. 3, the track 306 is divided into bitcells. For example, bitcell 339 includes a set of four contacts—two adjacent bottom contacts 344a, 344b and two adjacent top contacts 344a, 344b.

In the first phase 308, upper length contacts 332 are not driven to a predefined voltage level. For example, the upper length contacts 332 are designated as "floating", according to the definition given above. Lower length contacts 336, however, may be alternately-driven to a high voltage (e.g., an absolute voltage level can be arbitrarily chosen, so long as it is large enough to accommodate a current large enough to move the domain wall) and ground.

A potential difference between adjacent contacts 304 can cause a flow of current between the contacts 304 through the magnetic track 306. This causes the domain walls 324 to move in the direction of the current flow. However, the motion of a domain wall 324 is not sustained indefinitely, for at least two reasons (either alone or in combination).

First, the arrangement of the contacts 304 in a bitcell is such that the current sinks to ground at an end of the bitcell thus limiting movement of a domain wall 324. Consider the domain wall 340 on the far right of the track 306 of FIG. 3. A current flowing between the first two bottom contacts 344a, 344b, energized to a high voltage ("V") and ground ("G"), respectively, drives the domain wall 340 motion. When the current sinks to ground at the second contact 344b, the domain wall 340 cannot continue to move down the magnetic track 306. For example, in this scenario, there may be no stimulus allowing for further movement of the domain wall 340.

Second, a "back current" can flow between a third bottom contact 344c (energized to "V") and the second bottom contact 344b (ground). In an implementation, such a back current can also act to stabilize a position of the domain wall 340.

In the second phase 312, all the lower length contacts 336 can be left floating (as defined above) and the upper length contacts 332 can be driven to "V" and "G," once again in an alternating fashion. For example, as shown, the positions of the domain walls 324 can reflect a net motion caused by the first phase 308. In the second phase, the shifting process here is similar to that described with respect to the first phase 308. The current flow between two adjacent top contacts 348a, 348b of a bitcell 350 can cause the domain walls 324 to continue to shift to the left as shown in FIG. 3. The domain wall 324 positions can be again stabilized by the sinking of current to ground (e.g., from contact 348a to contact 348b) and the "back current" that flows from an adjacent energized contact (e.g., from contact 348c to contact 348b).

In the third phase 316, the upper length contacts 332 can again made to be floating, while the lower length contacts 336 can be alternately energized to "V" and "G." As shown, the lower length contacts 336 that were grounded in the first phase 308 are now energized to a high voltage, and those that were energized to a high voltage are now grounded. The same processes cause the domain walls to continue to shift along the magnetic track.

By the end of the fourth phase 320, where the lower length contacts 336 are floating and the upper length contacts 332 are energized, the domain walls 324 may be substantially shifted into a next bitcell. The four phases 308-320 can be repeated, beginning with conditions shown corresponding to the first phase.

As shown, in the example implementation of FIG. 3, a last domain wall 352 in the magnetic track 306 moves out of the field of view of by the end of the fourth phase 320. As such, the last domain wall 352 may not be annihilated.

Figure 4A:
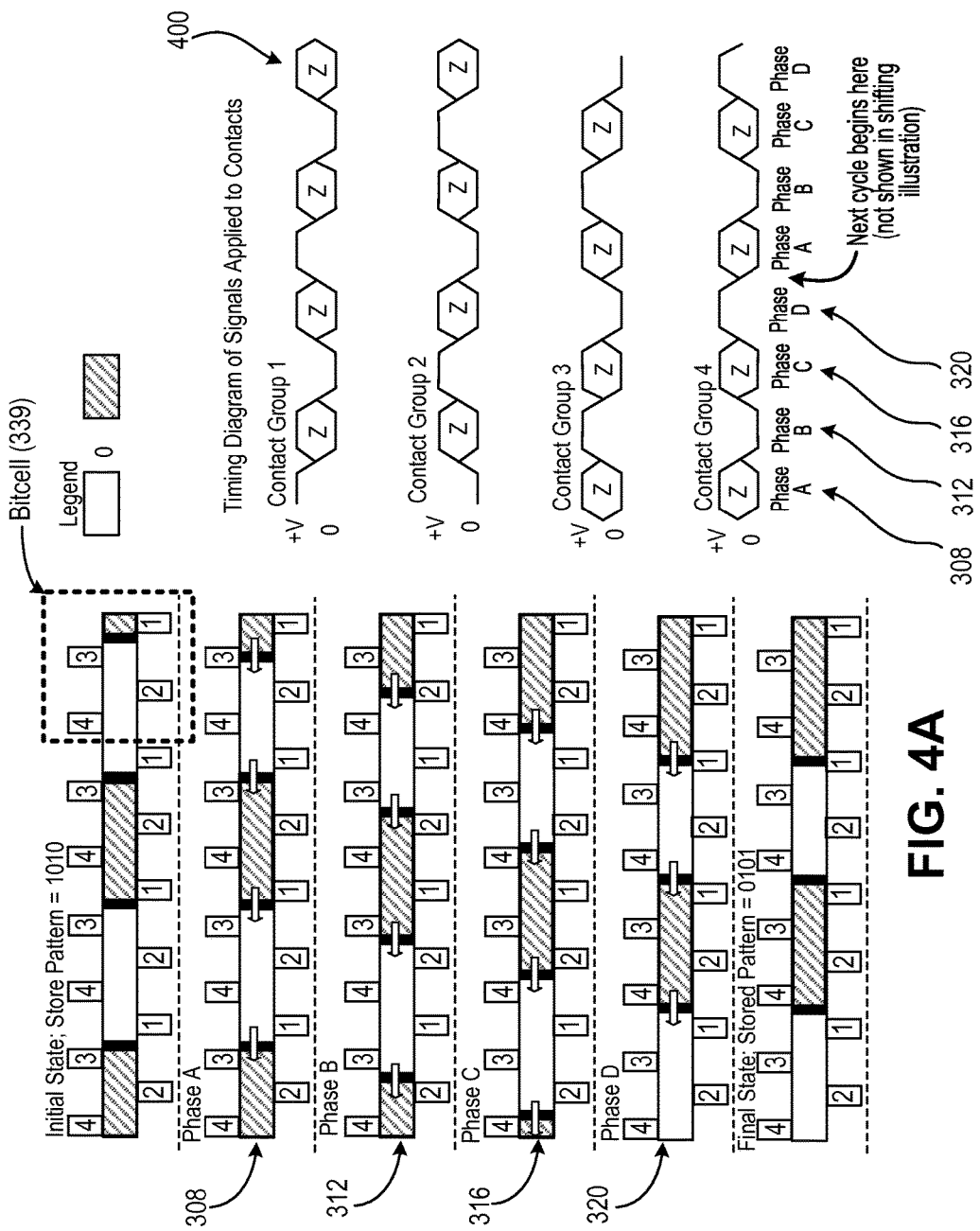
FIGS. 4A-4B show example phases and corresponding clocking schemes. An example direction of domain wall velocity in response to current is illustrated. On each phase, the domain walls can move further along the track.

FIG. 4A shows an example four-phase clocking scheme 400 to facilitate the phase progression described above in connection with FIG. 3. For example, a timing circuit can be connected to the contacts (e.g., the upper and lower length contacts 332, 336) to implement the clocking scheme 400 as described in further detail below. As shown, the labels on the contacts indicate shared connections. For example, the contacts labeled "1" can be connected to each other through leads (not explicitly shown). At different points in time, the contacts can be driven to a positive voltage, ground, or high impedance (although current can still flow through the lines connecting the contacts during the high-impedance phase). Similar to FIG. 3, the locations of the domain walls are noted in the track, with a direction of motion indicated by an arrow.

As shown in FIG. 4A, a domain wall velocity can be selected to be in a same direction as the direction of the current flow. In the first phase 308 (or Phase A), all the top contacts are driven to a high impedance state (shown as "Z" in the clocking scheme 400). The bottom contacts, however, are alternately-driven to a high voltage (e.g., +V volts) and ground (e.g., 0 volts). As described above, a potential difference between adjacent contacts of bitcell 339 causes a flow of current between the contacts through the magnetic track. This causes the domain walls to move in the direction of the current flow. However, the motion of the domain walls are not sustained indefinitely and the domain walls can no longer continue to move down the track after it has reached the end of bitcell 339.

In the second phase 312 (or Phase B), all the bottom contacts are driven to high impedance (Z) and the top contacts are now driven to positive voltage (+V volts) and ground (0 volts), once again in an alternating fashion.

In the third phase 316 (or Phase C), the top contacts are again driven to high impedance (Z), while the bottom contacts are alternately energized to positive voltage (+V volts) and ground (0 volts). By the end of the fourth phase 320 (or Phase D), where the bottom contacts are high-impedance (Z) and the top contacts energized (alternating +V volts and 0 volts), the domain walls are fully shifted into an adjacent bitcell. As shown, a next cycle (Phases 308-320 or A-D) can begin following the conclusion of the fourth phase (Phase D) of a previous cycle.

Figure 4B:
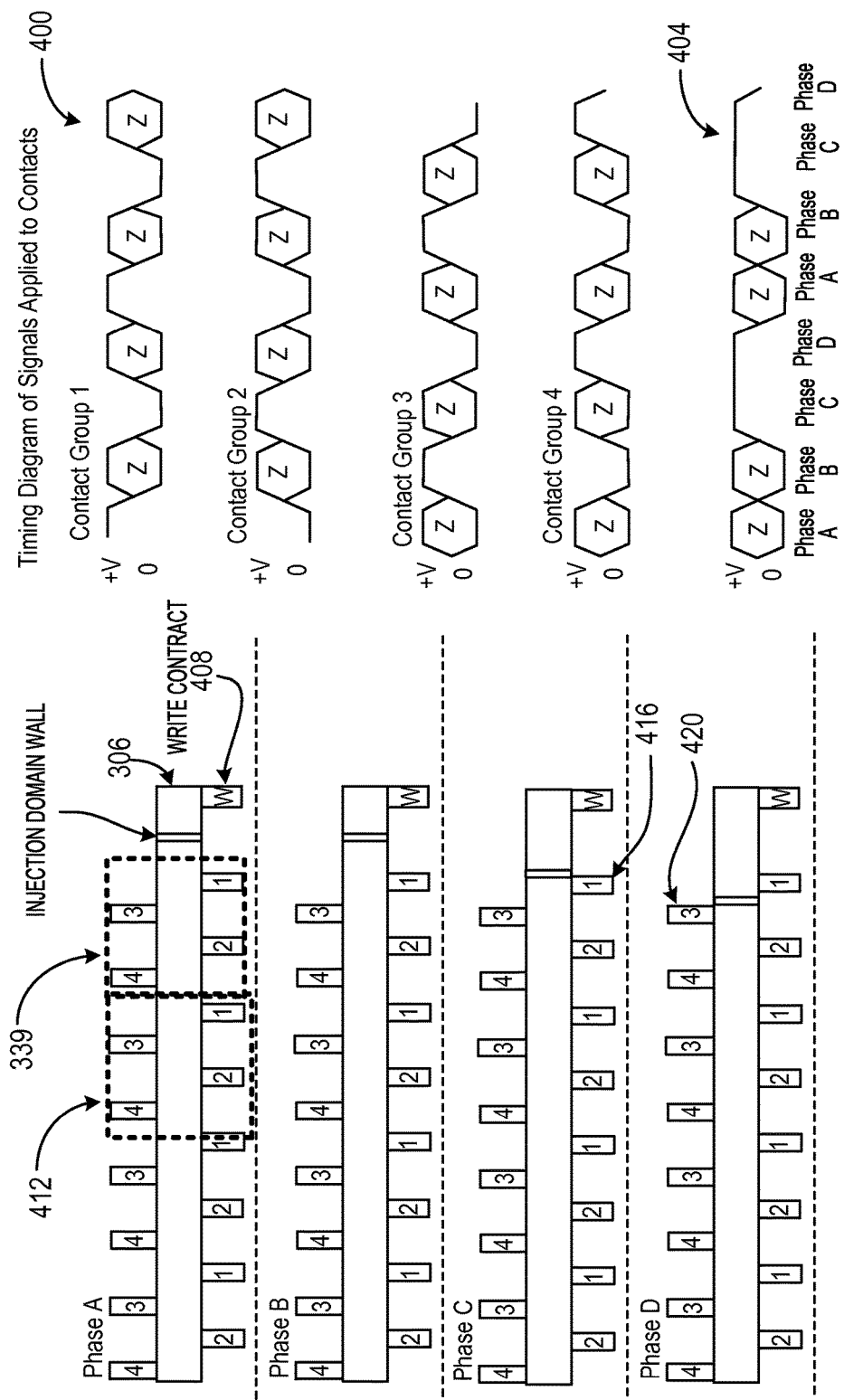

Referring to FIG. 4B, one way to store data in the magnetic track 306 may be through a write contact 408 connected to the magnetic track 306. FIG. 4B also shows example four-phase clocking scheme 400 and an example corresponding write clocking scheme 404 to be implemented through the write contact 408. For example, the write contact 408 may be connected to an end of the magnetic track 306. The write contact 408 may be configured to inject domain walls into the magnetic track 306 as a means for introducing data to the track 306.

As shown, the track conditions for phases A-D in FIG. 4B are different from that in FIG. 4A. In one example scenario, there may be no domain walls stored on the track 306. For example, all the bitcells on the track 306 may have magnetic domains with a same magnetization (e.g., all "up" or all "down" magnetizations) and as such there may be no domain walls on the track 306. In some cases, such a lack of domain walls may mean that a same data bit is stored in all bitcells (e.g., bitcells 339, 412) on the track 306. As an illustration, if an "up" magnetization represents the data bit logical-1 and each bitcell on the track 306 has an up magnetization (and therefore no domain walls), then the data stored on the track 306 may be all logical-1s.

An injection of a domain wall into the track 306 may indicate that a magnetic domain of a different magnetization from that stored on the track 306 has been written. In the above illustration, consider that a magnetic domain in a bitcell (e.g., bitcell 339) closest to the write contact 408 has an "up" magnetization (e.g., corresponding to a logical-1). If a logical-0 is to be written to the bitcell 339, then a domain wall can be injected into the track 306 thus shifting the current magnetic domain of up magnetization in the bitcell 339 to an adjacent bitcell 412 and introducing a magnetic domain of a "down" magnetization into the bitcell 339.

In some examples, a magnetic domain of a same magnetization as the magnetization in the bitcell 339 (e.g., a bitcell closest to the write contact 408) may need to be introduced. For example, the bitcell 339 can have a magnetic domain with an up magnetization (e.g., denoting logical-1), and another magnetic domain with an up magnetization may need to be introduced on the track 306. In such cases, the write contact does not inject a domain wall during the corresponding phase. Further, to the extent that there were already domain walls present on the track, the timing circuit may cause the existing domain walls to shift during the phase such that the up magnetization in the bitcell 339 is shifted to the adjacent bitcell 412. In this regard, at the end of the phase, both bitcells 412 and 339 can have magnetic domains with up magnetization. If there were initially no domain walls on the track 306, then both bitcells 412 and 339 would still have magnetic domains with up magnetization at the end of the phase.

A domain wall may be injected during the first or second phase. As shown in clocking scheme 404, the write contact 408 at the beginning of the magnetic track 306 can be energized during the third and fourth phases. In this manner, a current flow to ground can be established (e.g., through a first bottom contact 416 in the third phase and a first top contact 420 in the fourth phase). This results in the shifting of the injected domain wall into the storage track such that on the next cycle (i.e., next cycle of phases A-D) the domain wall can move as described above.

For example, to inject the domain wall during the first or second phases, a current can be injected into a nearby wire such that a circulating field about the wire nucleates a domain wall in the track, adjacent to the designated write contact 408. In an example, the portion of the track adjacent to the write contact 408 can be magnetically coupled to another magnetic device (e.g., another domain wall switching layer, magnetic tunnel junction, etc.) that can have its magnetization programmed with a current or field, which is then coupled to the track 306.

As already noted, the four shifting phases of the clocking scheme 400 may need one of three signals to be applied to a group of contacts at any given time: a nonzero voltage, ground, or a "floating" state. In implementation, these signals can be provided by a CMOS tri-state buffer/inverter. Such a circuit is capable of outputting a logic-0 (ground) and logic-1 (positive voltage), as well as a "high-impedance" or "Z" state where the output is driven to neither 0 nor 1.

Figure 4C:
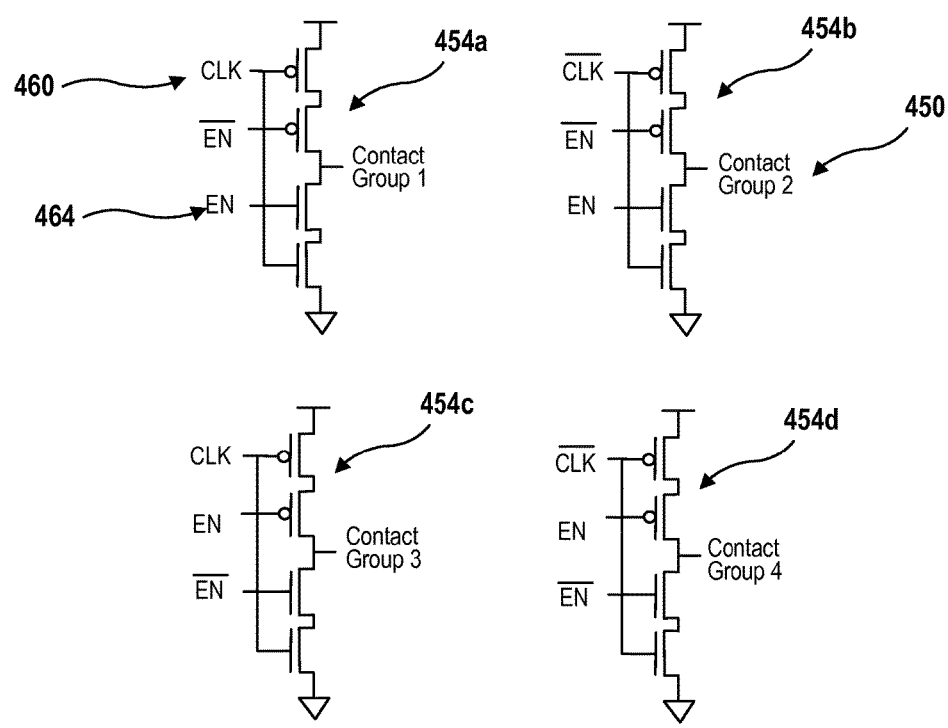
FIG. 4C shows an example timing circuit.

FIG. 4C shows an example timing (or driver) circuit 450 for implementing a clocking scheme (such as clocking scheme 400). Although there are four distinct phases of shifting that can occur to move data bits along a magnetic track 306, one global clock signal (CLK) 460 and enable signal (EN) 464 may be needed. For example, the clock signal CLK 460 can run at half the frequency of the enable signal 464. Other circuitry can be used to generate the clock signal 460 from the enable signal 464 by slowing the latter down. These circuits can be used to drive the structure shown in, for example, FIGS. 4A-B. As described above, the timing diagrams in FIGS. 4A-B can indicate a state of the signals applied to each contact group (e.g., contact group labelled 1-4 in FIGS. 4A-B). Each drive component 454a-d of the timing circuit 450 is connected to a corresponding contact group in the contact arrangement. As previously noted, the labels on the contacts indicate shared connections; all contacts labeled "1," for example, can be connected to each other through leads not explicitly shown.

Figure 5:
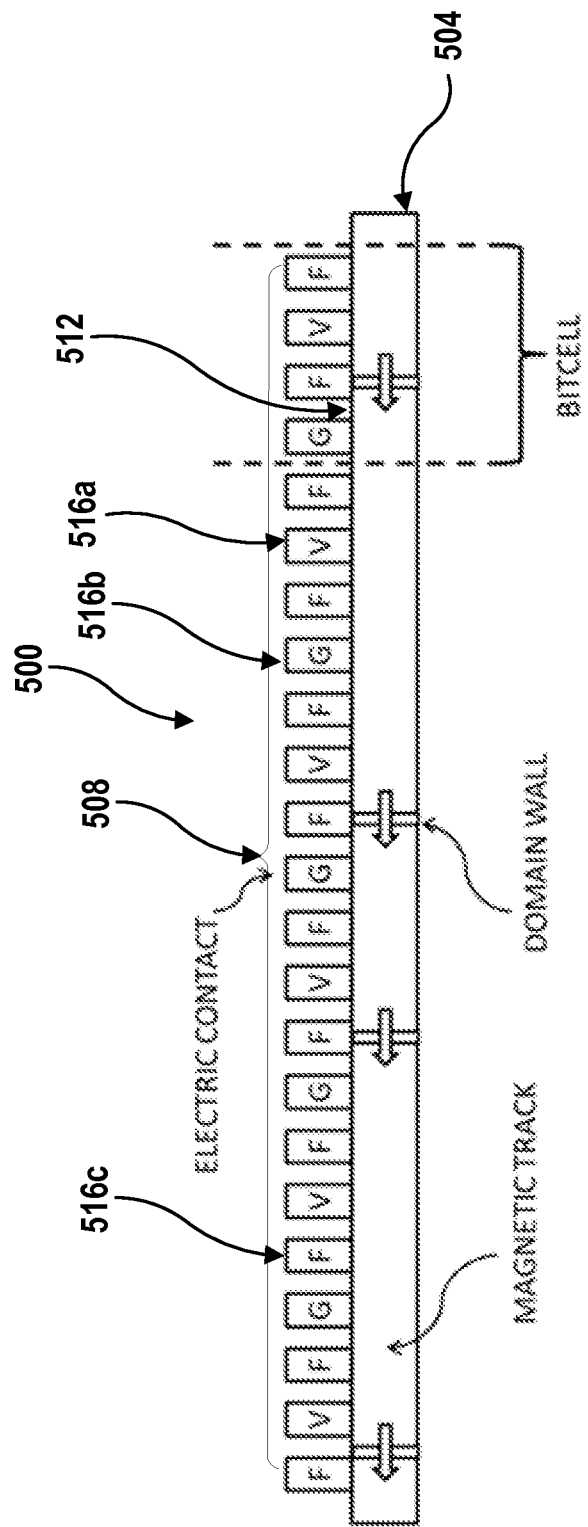
FIG. 5 shows an example shift register where the contacts are made on one surface of the magnetic track.

FIG. 5 shows an example contact arrangement 500 on a magnetic track 504. As shown, electric contacts 508 to the magnetic track 504 can be made along one surface (e.g., top side or surface 512) of the magnetic track 504. For example, the contacts 508 can be placed on either the top side or surface 512 or a bottom side or surface of the track 504. An example phase is shown in FIG. 5, indicating which contacts are driven at any given time. For example, the driven (or energized) contacts 516a, 516b can have labels "V" and G" that, as described above, correspond applied voltage and ground, or positive and negative voltages, or any other such drive voltage configurations. The undriven contacts 516c (or floating contacts, as described above) are labeled 'F." The driven contacts 516a, 516b can be alternately driven between a high voltage and ground, while the undriven contacts 516c that are interleaved between the driven contacts 516a, 516b are left floating. In a next phase, the contacts that are currently designated as floating contacts 516c in the phase shown in FIG. 5, can be energized to alternate between a high voltage and ground while those contacts that are currently driven 516a, 516b can be left floating.

Although the floating contacts 516c may not be directly driven to a defined voltage by a driver circuit, they may be connected to areas of the magnetic track 504 that are directly driven. As a result the floating contacts 516c may be indirectly driven and as such may have certain potentials. As a result, there is a possibility that a current (e.g., an undesirable current) may flow through certain "sneak paths." Such currents may result in energy waste and may also affect the domain wall motion.

Figure 6:
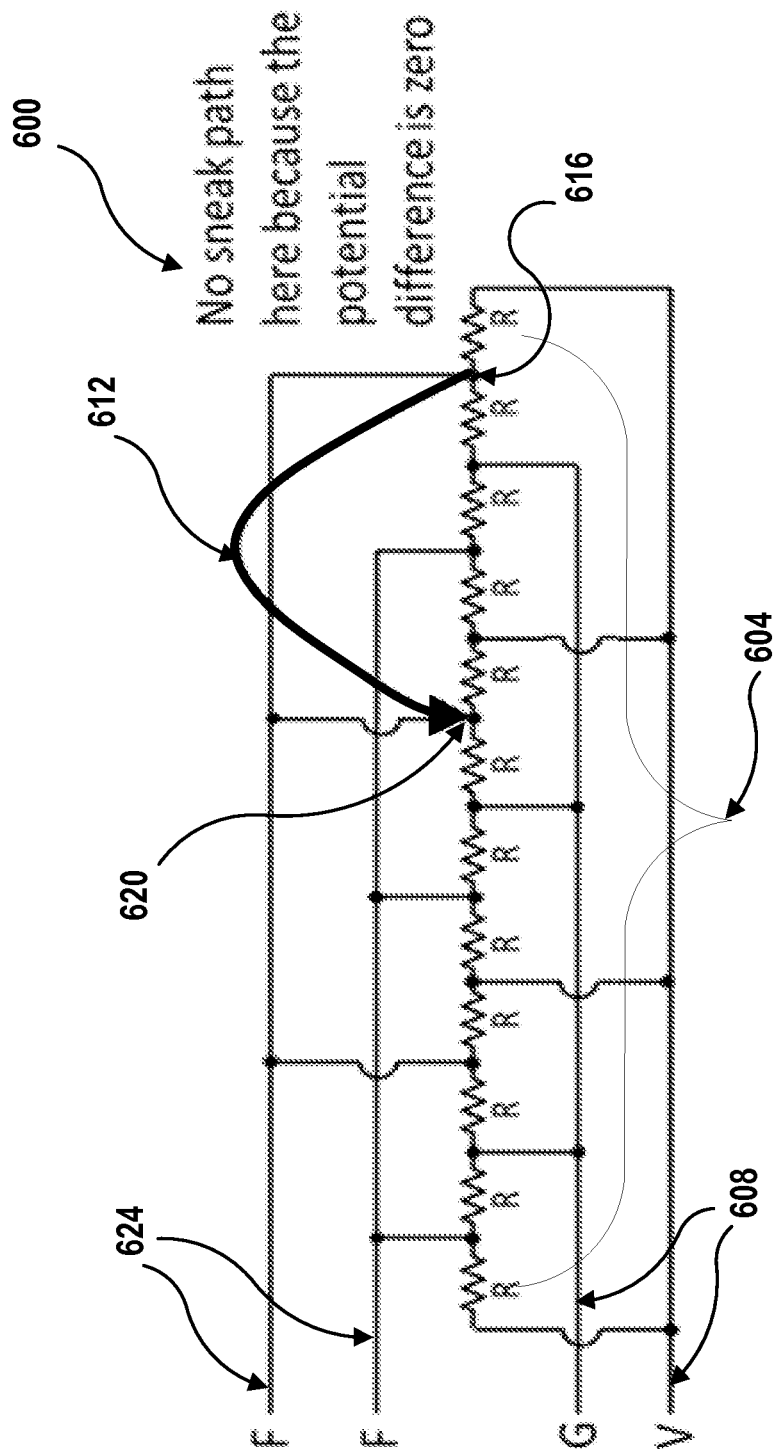
FIG. 6 shows an example equivalent circuit schematic of the magnetic track, indicating that when signal lines are driven, a potential difference between two points on the track that could constitute a sneak path may be nominally zero. As such, there may be little or no sneak path current.

In an implementation, a design of the serial magnetic shift memory can be implemented to avoid current sneak paths or at least minimize the effect it may have on domain wall motion. For example, FIG. 6 shows an equivalent circuit model 600 of the magnetic track of FIG. 3 (e.g., in phase one 308 configuration). The track (e.g., track 306 of FIG. 3) can be represented as a series resistance segments 604 (denoted R). The wires supplying the voltages 608 (denoted V and G) and connecting the appropriate contacts together may be treated as ideal wires (e.g., there is there resistance drop due to the wires). In some examples, treating the wires as resistive segments (similar to resistance segments 604) does not change the analysis.

As shown, a possible current sneak path 612 may connect point 616 with point 620. These are points that should be at a same potential because they are connected to wires 624 (labeled "F") corresponding to the floating upper length contacts 332 of FIG. 3.

Referring to FIG. 3, when energizing the lower length contacts 336, it is possible that a current may flow up through an upper length contact (e.g., contact 360a shown in the top right corner of FIG. 3) that lies between the energized contact 344a (V) and ground (G) 344b, along at least two upper length contacts (e.g., contacts 360a and 360b), and then back down into the track 306 through upper length contact 360b.

However, as shown in the equivalent circuit model 600 of FIG. 6, a potential difference between the two points 616 and 620 that are connected by the floating wires 624 is zero. For example, this may mean that there a sneak path current is reduced to zero or at least minimized. In some examples, if the potentials are not exactly balanced, then there may be some current flowing through the floating wires 624. In such cases, this current would likely not be very significant and may not hinder the domain wall motion. Such currents may be minimized with proper contact layout technique.

Figure 7:
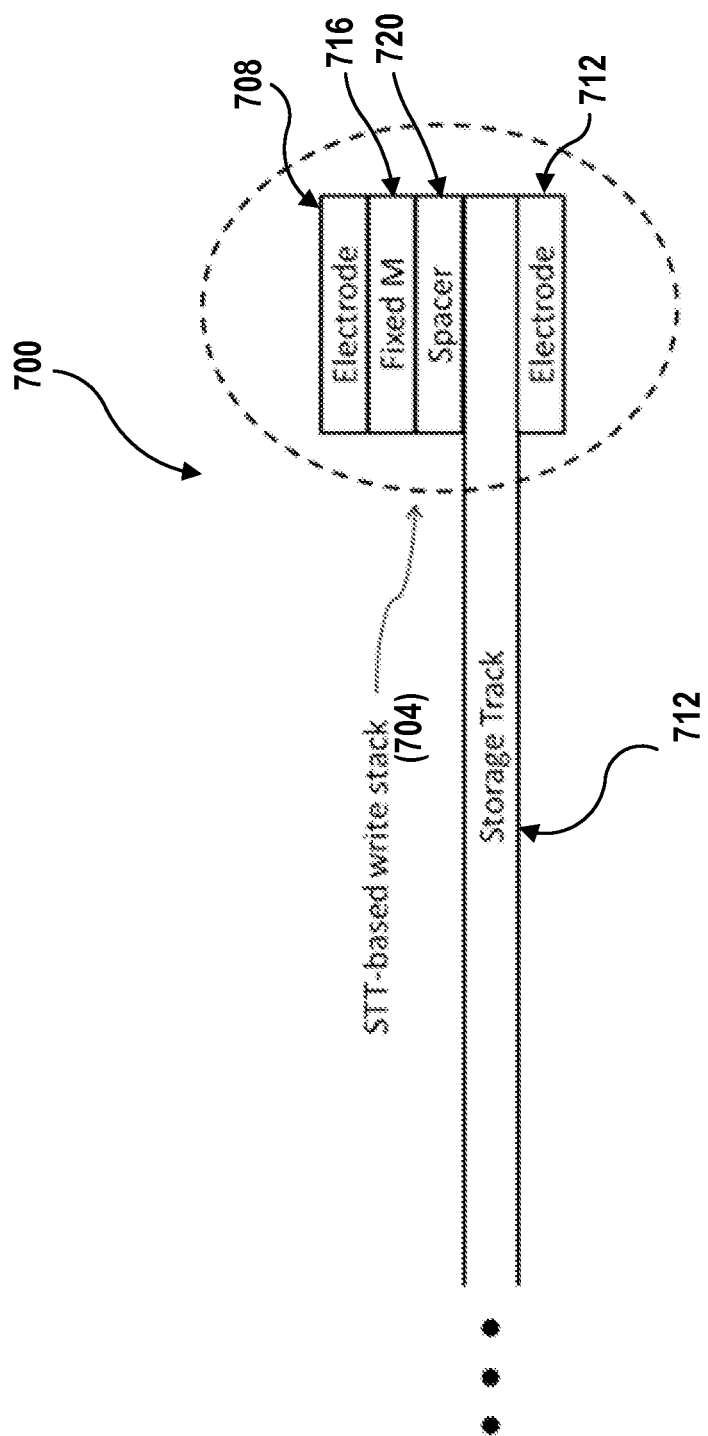
FIG. 7 shows an example write mechanism.

FIG. 7 shows an example writing mechanism 700 for writing data to a magnetic storage track 702. For example, writing to the track 702 may involve using spin-transfer torque (STT) techniques. For example, a writing stack 704 can include top and bottom electrodes 708, 712, a fixed magnetization layer 716, and a spacer 720 that may be deposited along with the storage track 702. A current can be injected between the top and bottom leads 708, 712. The injected current can orient a magnetization of the magnetic storage track 712 underneath the spacer 720 to be either parallel or antiparallel to a fixed magnetization direction (e.g., in the fixed magnetization layer 716 denoted as "Fixed M") depending on the direction of the injected current.

Figure 8:
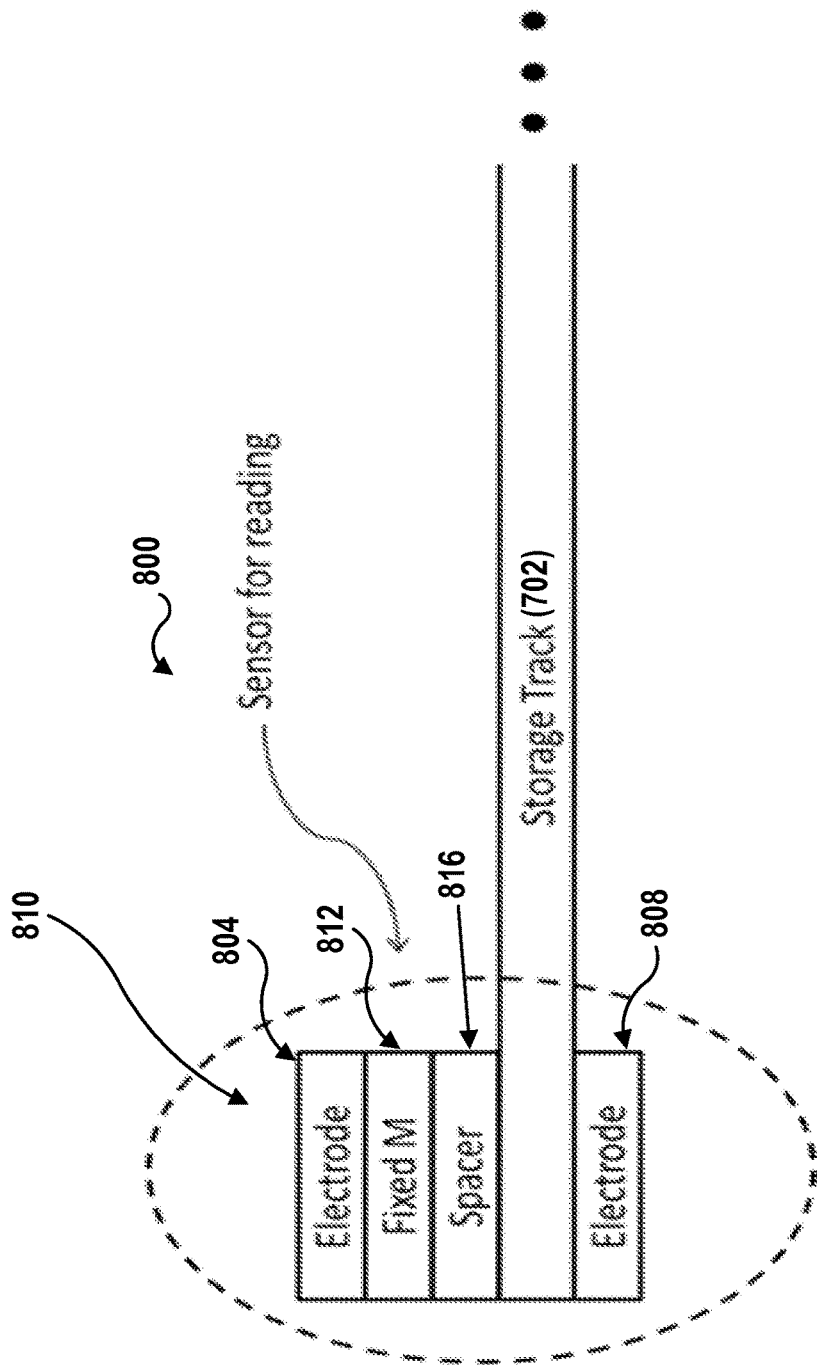
FIG. 8 shows an example read mechanism.

FIG. 8 shows an example reading mechanism 800 for reading data from a magnetic storage track 702. For example, the reading mechanism 800 can be a device that can detect a magnetization orientation (e.g., up or down orientation) of a magnetic domain at some point in the track 702 may be used. For example, the reading mechanism can be implemented by a magnetic tunnel junction or giant magnetoresistive (GMR) stack. For example, the magnetic tunnel junction or giant magnetoresistive (GMR) stack can be directly integrated with the reading mechanism 800, or positioned above or below the track 702.

As shown in FIG. 8, a reading stack 810 can include top and bottom electrodes 804, 808, a fixed magnetization layer 812, and a spacer 816 that are deposited along with the storage track 702. In one example, a resistance between the top and bottom electrodes 804, 808 can be high when a magnetization of the storage track 702 under the spacer 816 is antiparallel to the fixed magnetization of the magnetization layer 812 above the spacer 816. In another example, the resistance between the top and bottom electrodes 804, 808 can be low when the magnetization of the storage track 702 under the spacer 816 is parallel to the fixed magnetization of the magnetization layer 812 above the spacer 816. For example, the spacer 816 can be based on a material involving a tunnel barrier to form a magnetic tunnel junction, or a conductive layer to form a GMR stack.

Figure 9:
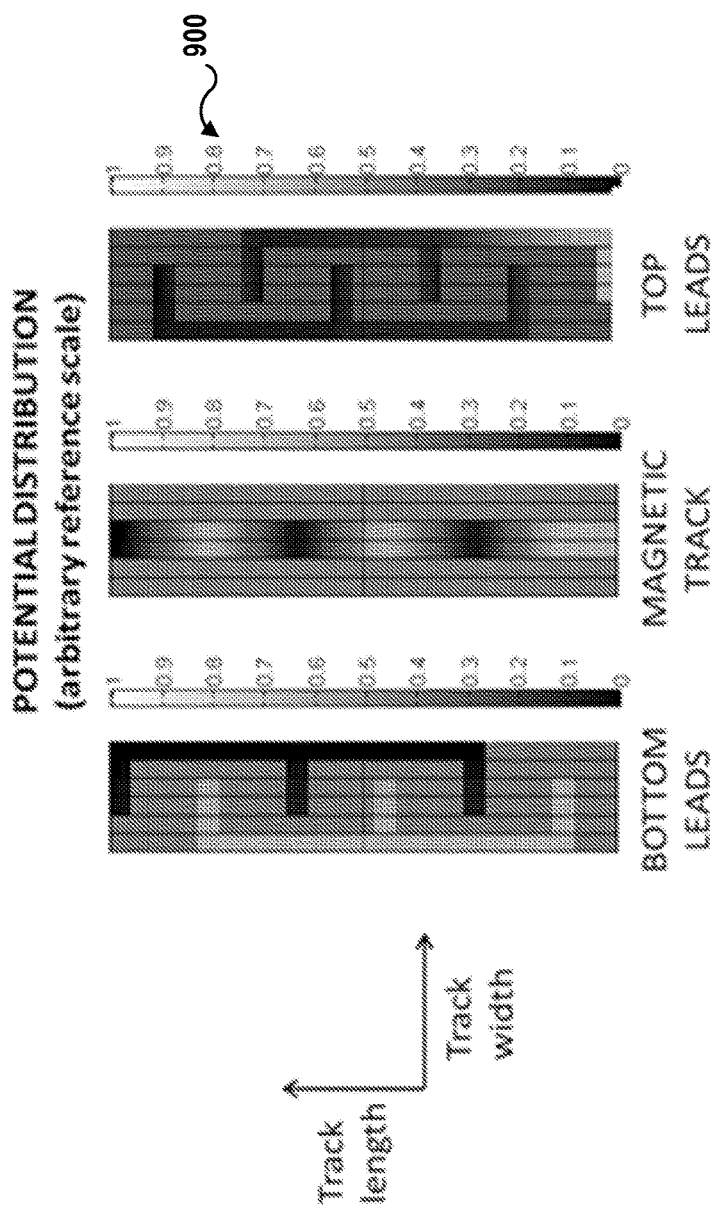
FIG. 9 shows an example simulation of the potential distribution in the magnetic track and the top leads when the bottom leads are driven to a positive voltage and ground. Heat plots indicate a potential difference along the magnetic track, and thus examples current flow that can move a domain wall. As shown, there can be almost no potential difference along the top leads, indicating the sneak path current is roughly zero, except at the first contact.

FIG. 9 shows an example simulation 900 of the potential distribution by solving Poisson's equation when the lower length contacts (e.g., contacts 336 of FIG. 3) are energized and the upper length contacts (e.g., contacts 332 of FIG. 3) are floating. In some examples, there may be a negligible potential difference within the upper length contacts, indicating that any potential sneak path current may be minimal One possible exception is a potential difference that occurs at the beginning of the track due to a way the contacts in the simulation were driven, but this may not affect the shifting process.

Figure 10:
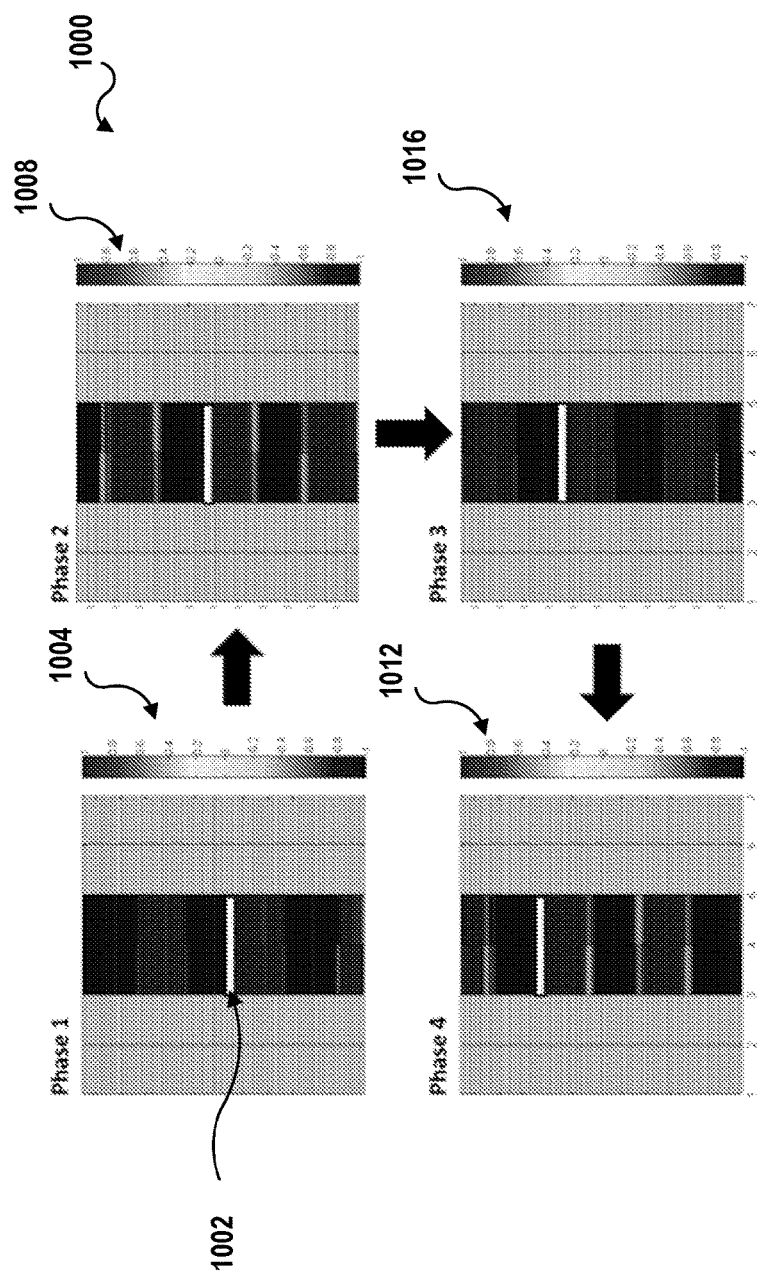
FIG. 10 shows an example simulation of current flow along the magnetic track during each clocking phase. As shown, a current can be applied such that a domain wall progresses along the track. The wall may not move beyond a stopping point due at least in party to the current sinking to ground.

FIG. 10 is an example simulation 1000 of Poisson's equation performed to calculate a current flowing along a magnetic storage track in the phases described above (see, e.g., FIGS. 4A-B and associated discussion). For example, a domain wall 1002 (represented by a white bar in each phase 1004-1016), is shown in a final position after each phase 1004-1016. As shown in the example scenario of simulation 1000, in the first phase 1004, the domain wall 1002 is positioned corresponding to a position below 0 (zero) on the scale. In the second phase 1008, the domain wall 1002 has moved upwards to a second position between 0 and 0.2 on the scale. In the third phase 1012, the domain wall has moved to a third position between 0.2 and 0.4 on the scale. By the end of the fourth phase 1016, the domain wall has fully shifted into an adjacent bitcell (beyond the position 0.4 on the scale). The resting position of the domain wall 1002 is where the current sinks to ground, and further where the "back current" prevents further onward motion.

In an ideal magnetic wire, a domain wall is free to drift due to thermal agitation. Rather than having to pattern notches in the track to create stable domain wall positions, the examples described herein allow for inherent pinning sites (e.g., stable wall positions in steady state) due to contacts placed along the entire magnetic storage track. Due to a non-ideality of fabrication and making contacts to the magnetic track, areas under the contacts may be lower energy sites for the domain walls. Thus, when driven, the domain walls can move to a contact and stop when the current sinks to ground. When the current is off, the domain walls remain at the contact where it stopped.

For a threshold current density (e.g., a smallest current density required to move a domain wall) of 25 MA/cm$^2$, which can be achieved with various film structures including Co/Ni multilayer stacks, a track 20 nm wide and 2 nm thick implies that a smallest current required to move a domain wall is 10 μA. For example, domain walls can travel at very high velocity (e.g., exceeding 1 km/s) at the levels of current density described above. Assuming each phase is applied for 500 ps, a total time to shift a full bit position can be 2 ns. With a total bitcell resistance of 100Ω, and accounting for "back current" that may double an amount of energy dissipated in the shifting process, there is a total energy expended of 40 aJ per shift per bit.

In some cases, with many bits stored on a single track there can be latency involved in accessing a single bit. In an implementation, such latency can be mitigated by writing to multiple independent shift registers, rather than increasing a length of a single shift register (magnetic track) itself. For example, each shift register can be addressed and accessed independently via write and read peripherals. In such an example, each magnetic track can share the same leads.

Figure 11:
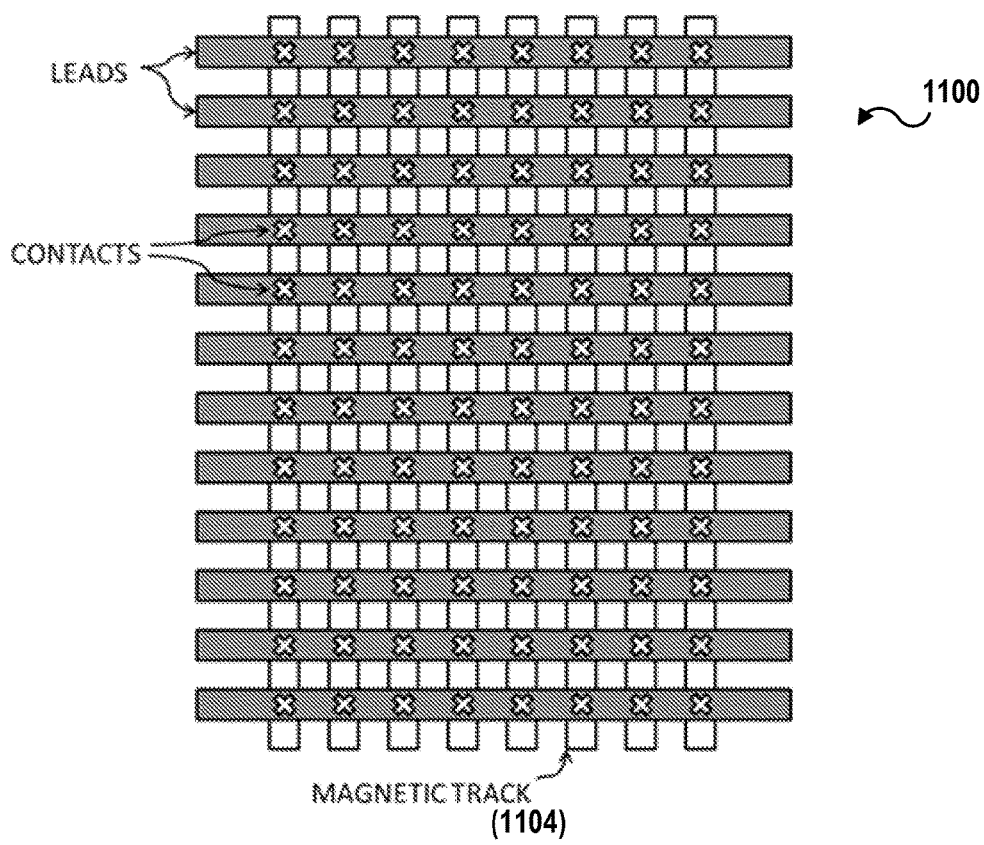
FIGS. 11-13 show example multitrack devices.

FIG. 11 illustrates an example magnetic shift storage device 1100 having multiple magnetic storage tracks 1104. As shown, the example device 1100 has eight tracks 1104 for illustration only. For example, n tracks can be placed side-by-side, with spacing limited by, for example, a minimum pitch. A grating-based layout such as shown in connection with device 1100 can be compatible with modern scaled fabrication technology. In some examples, three-dimensional integration may be possible.

Figure 12:
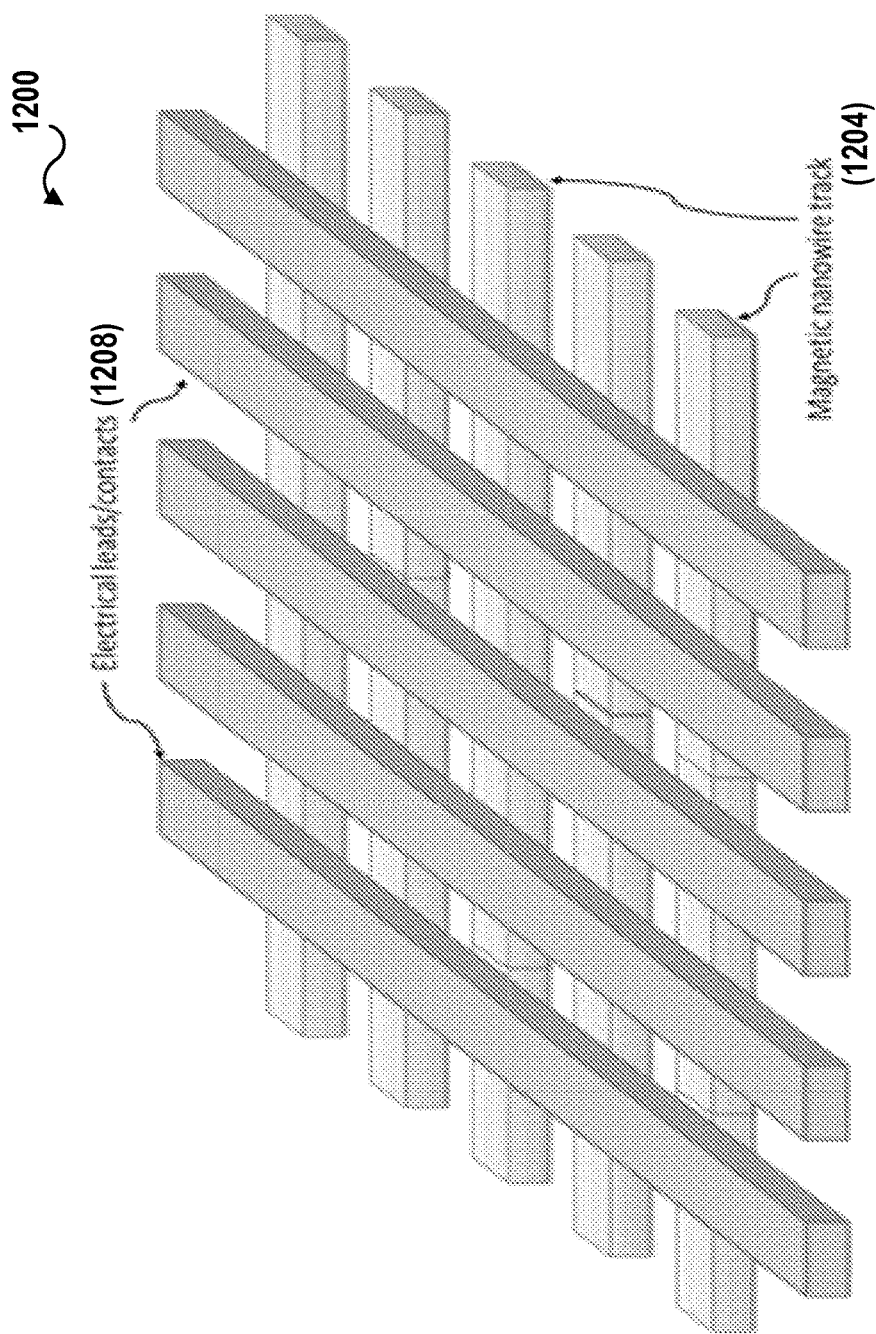
Figure 13:
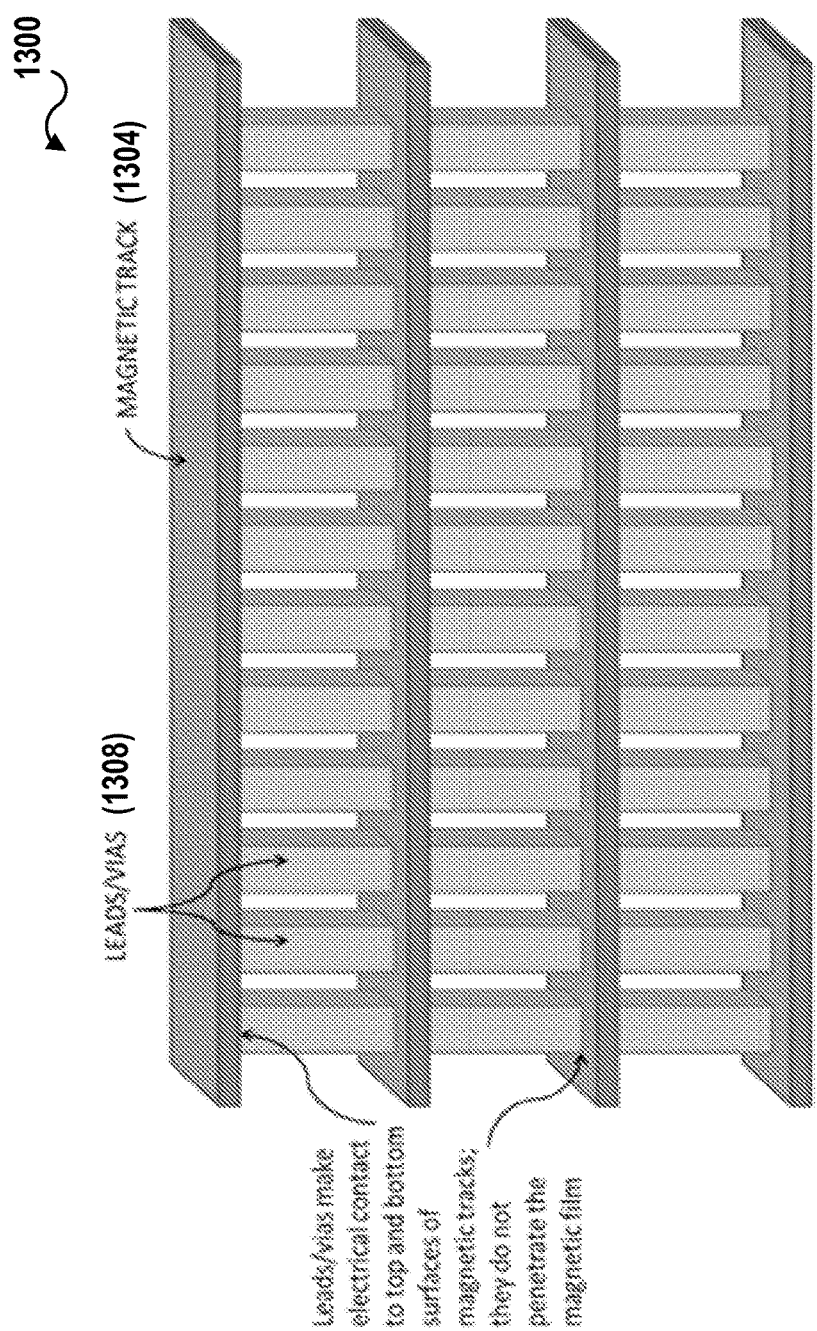

FIGS. 12 and 13 show devices 1200, 1300 having magnetic tracks 1204, 1304 that are stacked in a vertical dimension, and leads or vias 1208, 1308 connecting the contacts on the tracks 1204, 1304 such that all tracks 1204, 1304 can be driven together.

In some cases, the schemes illustrated in FIGS. 11-13 can increase memory density. In an example, such schemes can be implemented using four total contacts per bitcell.

The contact arrangement shown in FIGS. 11-13 is based off the example contact arrangement of FIG. 5. In some examples, the contact arrangement of FIGS. 4A-B can use used in creating multitrack devices. In general, a memory density can be limited by a number of contacts. For example, the contacts or leads can be patterned using lithography, or can be made from nanowires that are self-assembled or aligned on a grid. In some examples, imprint lithography can also be used to pattern the contacts or leads.

Other examples are within the scope and spirit of the description and claims. Additionally, certain functions described above can be implemented using software, hardware, firmware, hardwiring, or combinations of any of these. Features implementing functions may also be physically located at various positions, including being distributed such that portions of functions are implemented at different physical locations. The use of the term "a" herein and throughout the application is not used in a limiting manner and therefore is not meant to exclude a multiple meaning or a "one or more" meaning for the term "a." Additionally, to the extent priority is claimed to a provisional patent application, it should be understood that the provisional patent application is not limiting but includes examples of how the techniques described herein may be implemented.

It will thus be seen that the objects set forth above, among those made apparent from the preceding description, are efficiently attained and, because certain changes may be made in carrying out the above method and in the construction(s) set forth without departing from the spirit and scope of the disclosure, it is intended that all matter contained in the above description and shown in the accompanying drawings shall be interpreted as illustrative and not in a limiting sense.

A number of exemplary implementations of the invention have been described. Nevertheless, it will be understood by one of ordinary skill in the art that various modifications may be made without departing from the spirit and scope of the invention.

What is claimed is:

1. A memory device, comprising:
    at least one magnetic track on a substrate, wherein the at least one magnetic track comprises one or more magnetic domains;
    contacts disposed on the at least one magnetic track according to a predetermined arrangement to form a plurality of bitcells on the at least one magnetic track, wherein each one of the plurality of bitcells is configured to store at least one magnetic domain; and
    a timing circuit connected to the contacts, with the timing circuit being configured to apply to the contacts multiple phases of electric currents according to a predetermined timing sequence to cause the at least one magnetic domain to shift from the each one of the plurality of bitcells to an adjacent one of the plurality of bitcells on the at least one magnetic track.

2. The memory device of claim 1, wherein the at least one of the one or more magnetic domains comprises a magnetic domain of a first or a second magnetization as a data bit.

3. The memory device of claim 1, wherein the contacts disposed on the at least one magnetic track according to the predetermined arrangement comprise contacts disposed along first and second lengths of the at least one magnetic track.

4. The memory device of claim 1, wherein the contacts disposed on the at least one magnetic track according to the predetermined arrangement comprise contacts disposed along a first length of the at least one magnetic track and not along a second length of the at least one magnetic track.

5. The memory device of claim 1, wherein the contacts disposed on the at least one magnetic track according to the predetermined arrangement comprises:
    a first set of the contacts disposed along a first length of the at least one magnetic track;
    a second set of the contacts also disposed along the first length of the at least one magnetic track, wherein the first set of the contacts are spatially interleaved with the second set of the contacts;
    a third set of the contacts disposed along a second length of the at least one magnetic track; and
    a fourth set of contacts also disposed along the second length of the at least one magnetic track, wherein the third set of the contacts are spatially interleaved with the fourth set of the contacts.

6. The memory device of claim 1, wherein the contacts disposed on the at least one magnetic track according to the predetermined arrangement comprises:
    a first set of the contacts disposed along a first length of the at least one magnetic track and connected to a top side of the at least one magnetic track;
    a second set of the contacts disposed along the first length of the at least one magnetic track and connected to a bottom side of the at least one magnetic track, wherein the first set of the contacts are spatially interleaved with the second set of the contacts;
    a third set of the contacts disposed along a second length of the at least one magnetic track and connected to the top side of the at least one magnetic track; and
    a fourth set of contacts disposed along the second length of the at least one magnetic track and connected to the bottom side of the at least one magnetic track, wherein the third set of the contacts are spatially interleaved with the fourth set of the contacts.

7. The memory device of claim 1, wherein the contacts disposed on the at least one magnetic track according to the predetermined arrangement comprises:
    a first set of the contacts connected to a selected one of a top or bottom side of the at least one magnetic track.

8. The memory device of claim 1, wherein the each one of the plurality of bitcells comprises a selected set of the contacts, and wherein the timing circuit is configured to apply to the contacts:
    first phases of electric currents such that a first pair of the selected set of the contacts is driven to complementary signal levels while a second, different pair of the selected set of the contacts is in a high impedance state; and
    second phases of electric currents such that the second pair of the selected set of the contacts is driven to the complementary signal levels while the first pair of the selected set of the contacts is in the high impedance state.

9. The memory device of claim 1, wherein the magnetic domains are comprised of at least two magnetic domains of opposing first and second magnetizations that are separated by a domain wall.

10. The memory device of claim 1, wherein at least one of the plurality of bitcells comprises a domain wall separating magnetic domains of opposing first and second magnetizations.

11. The memory device of claim 10, wherein the domain wall can be moved based on a one of a a) spin-transfer torque principle, b) spin-orbit torque principle, or c) combination of spin-transfer torque principle, and spin-orbit torque principle.

12. The memory device of claim 1, wherein the each one of the plurality of bitcells comprises a selected set of the contacts and a domain wall, and wherein causing the at least one magnetic domain to shift from the each one of the plurality of bitcells to an adjacent one of the plurality of bitcells on the at least one magnetic track comprises:
    applying complementary signal levels to a first pair of the selected set of the contacts to cause a flow of current between the first pair of the selected set of the contacts, the flow of current causing the domain wall to move in a same or an opposite direction relative to the flow of current.

13. The memory device of claim 1, wherein the each one of the plurality of bitcells comprises a selected set of the contacts and a domain wall, and wherein a movement of the domain wall is at least partially controlled by a back current flowing from one to another of a first pair of the selected set of the contacts driven by complementary signal levels.

14. The memory device of claim 1, wherein the predetermined arrangement of the contacts along the at least one magnetic track is selected to avoid a flow of current between contacts that are connected to a driver with an output that is in a high impedance state.

15. The memory device of claim 1, further comprising a read device connected to the at least one magnetic track for detecting a magnetization of a magnetic domain on the at least one magnetic track as a data bit.

16. The memory device of claim 15, wherein the read device is a selected one of a) a magnetic tunnel junction, and b) a giant magnetoresistive stack.

17. The memory device of claim 1, further comprising a write device for injecting a domain wall into the at least one magnetic track by causing a current to flow through a wire, wherein the write device comprises the wire disposed adjacent to the at least one magnetic track.

18. The memory device of claim 1, further comprising a write device for injecting a domain wall into the at least one magnetic track, wherein the write device comprises a magnetic device that is magnetically coupled to a portion of the at least one magnetic track.

19. The memory device of claim 1, further comprising a write device for injecting a domain wall into the at least one magnetic track, wherein the write device is based on a spin-transfer torque technique.

20. The memory device of claim 1, wherein the timing circuit comprises a CMOS tri-state drive circuit configured to output at least a logic-1 state and a logic-0 state corresponding to predetermined complementary signal levels, and a high-impedance state corresponding to a floating contact state.

21. A method, comprising:
 obtaining at least one magnetic track on a substrate, wherein the at least one magnetic track comprises one or more magnetic domains;
 obtaining contacts disposed on the at least one magnetic track according to a predetermined arrangement to form a plurality of bitcells on the at least one magnetic track, wherein each one of the plurality of bitcells is configured to store at least one magnetic domain of the one or more magnetic domains; and
 applying to the contacts multiple phases of electric currents according to a predetermined timing sequence to cause the at least one magnetic domain to shift from the each one of the plurality of bitcells to an adjacent one of the plurality of bitcells on the at least one magnetic track.

22. The method of claim 21, wherein the each one of the plurality of bitcells comprises a selected set of the contacts and wherein applying to the contacts multiple phases of electric currents according to a predetermined timing sequence comprises:
 applying first phases of electric currents such that a first pair of the selected set of the contacts is driven to complementary signal levels while a second, different pair of the selected set of the contacts is in a high impedance state; and
 applying second phases of electric currents such that the second pair of the selected set of the contacts is driven to the complementary signal levels while the first pair of the selected set of the contacts is in the high impedance state.

23. A memory device, comprising:
 a plurality of magnetic tracks;
 contacts disposed on each one of the plurality of magnetic tracks to form a plurality of bitcells on the each one of the plurality of magnetic tracks, wherein the contacts comprise:
  a first set of the contacts that are disposed along a first length of the each one of the plurality of magnetic tracks;
  a second set of the contacts that are also disposed along the first length of the each one of the plurality of magnetic tracks, wherein the first set of the contacts are spatially interleaved with the second set of the contacts;
  a third set of the contacts that are disposed along a second length of the each one of the plurality of magnetic tracks; and
  a fourth set of contacts that are also disposed along the second length of the each one of the plurality of magnetic tracks, wherein the third set of the contacts are spatially interleaved with the fourth set of the contacts; and
 a timing circuit connected to the contacts.

* * * * *

UNITED STATES PATENT AND TRADEMARK OFFICE
CERTIFICATE OF CORRECTION

PATENT NO. : 10,026,431 B2
APPLICATION NO. : 15/032951
DATED : July 17, 2018
INVENTOR(S) : David M. Bromberg, Lawrence Pileggi and Jian-Gang Zhu Page 1 of 1

It is certified that error appears in the above-identified patent and that said Letters Patent is hereby corrected as shown below:

In the Specification

Column 1, Line 5, after "application" insert -- is a § 371 National Stage Application of PCT/US2014/063319, filed October 31, 2014, which, in turn, --

Column 1, Line 7, after "of" insert -- each of --

Column 1, Line 8, after "prior-filed" delete "provisional"

Column 1, Line 8, delete "application" and insert -- applications --

Signed and Sealed this
Twenty-fifth Day of September, 2018

Andrei Iancu
*Director of the United States Patent and Trademark Office*